(12) United States Patent
Sakai et al.

(10) Patent No.: US 10,282,145 B2
(45) Date of Patent: May 7, 2019

(54) PRINTER DRIVER AND POS SYSTEM

(71) Applicant: SEIKO EPSON CORPORATION, Tokyo (JP)

(72) Inventors: Atsushi Sakai, Sakaki-machi (JP); Masatoshi Nakazawa, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/550,264

(22) PCT Filed: Jan. 28, 2016

(86) PCT No.: PCT/JP2016/000443
§ 371 (c)(1),
(2) Date: Aug. 10, 2017

(87) PCT Pub. No.: WO2016/129226
PCT Pub. Date: Aug. 18, 2016

(65) Prior Publication Data
US 2018/0018136 A1    Jan. 18, 2018

(30) Foreign Application Priority Data

Feb. 12, 2015   (JP) .................................. 2015-025041
Dec. 28, 2015   (JP) .................................. 2015-256057

(51) Int. Cl.
*G06F 3/12*  (2006.01)
*G07G 1/06*  (2006.01)
*G06F 9/54*  (2006.01)

(52) U.S. Cl.
CPC .......... *G06F 3/1225* (2013.01); *G06F 3/1206* (2013.01); *G06F 3/1236* (2013.01);
(Continued)

(58) Field of Classification Search
CPC ...... G06F 3/1225; G06F 9/546; G06F 3/1206; G06F 3/1236; G06F 3/1243; G06F 3/1284; G06F 3/1288
(Continued)

(56) References Cited

U.S. PATENT DOCUMENTS 8,711,403 B2   4/2014   Watanabe
9,058,133 B2   6/2015   Takamoto
(Continued)

FOREIGN PATENT DOCUMENTS

EP    2 287 746 A2    2/2011
JP    H11-191089 A    7/1999
(Continued)

OTHER PUBLICATIONS

International Search Report dated Mar. 8, 2016 in PCT/JP2016/000443 with English-language translation (4 pgs.).
(Continued)

*Primary Examiner* — Neil R McLean
(74) *Attorney, Agent, or Firm* — Foley & Lardner LLP

(57) ABSTRACT

While a specific application is running, a printer driver enables printing other data that is not data from the specific application. A dedicated driver (printer driver) that runs on a POS terminal occupies a communication port when receipt data is supplied from a POS application. The dedicated driver also sends print data generated based on the receipt data through the communication port to a POS printer. After continuing for a previously set time, the dedicated driver releases the communication port.

9 Claims, 5 Drawing Sheets

(52) U.S. Cl.
CPC .......... *G06F 3/1242* (2013.01); *G06F 3/1243* (2013.01); *G06F 3/1284* (2013.01); *G06F 3/1288* (2013.01); *G06F 9/546* (2013.01); *G07G 1/06* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2005/0141007 A1* | 6/2005 | Shirai | G06F 3/0486 358/1.13 |
| 2008/0204798 A1* | 8/2008 | Taniguchi | G06F 3/1204 358/1.15 |
| 2010/0027065 A1 | 2/2010 | Koakutsu | |
| 2011/0013223 A1 | 1/2011 | Nishimura et al. | |
| 2011/0102838 A1* | 5/2011 | Watanabe | G06F 3/1203 358/1.15 |
| 2011/0216346 A1* | 9/2011 | Takamoto | G06F 3/12 358/1.14 |
| 2011/0292424 A1 | 12/2011 | Murata | |
| 2012/0030001 A1 | 2/2012 | Takeuchi | |
| 2014/0376009 A1 | 12/2014 | Takamoto | |

FOREIGN PATENT DOCUMENTS

| | | |
|---|---|---|
| JP | 2006-159424 A | 6/2006 |
| JP | 2011-022918 A | 2/2011 |
| JP | 2011-186718 A | 9/2011 |
| JP | 2011-248610 A | 12/2011 |
| JP | 2012-032999 A | 2/2012 |
| JP | 5397162 B2 | 1/2014 |
| JP | 2014-200918 A | 10/2014 |

OTHER PUBLICATIONS

Extended European Search Report dated Apr. 4, 2018 in related European Appl. 16748874.1 (7 pgs.).

* cited by examiner

PRINTER DRIVER AND POS SYSTEM

CROSS-REFERENCE TO RELATED APPLICATIONS

This application is a national stage entry of PCT/JP2016/000443, filed Jan. 28, 2016; which claims priority to Japanese Application No. 2015-025041 filed Feb. 12, 2015, and Japanese Application No. 2015-256057 filed Dec. 28, 2015; the disclosures of both of which are incorporated by reference in their entirety.

TECHNICAL FIELD

The present invention relates to a printer driver that controls a printer to print application data from a specific application. The invention also relates to a POS system including a POS terminal that runs the specific application, and a printer.

BACKGROUND

A POS system has a POS terminal located at a checkout counter, and a printer connected to the communication port of the POS terminal. A POS application for printing receipts, and a printer driver that controls driving the printer, run on the POS terminal. The printer driver generates print data that causes the printer to print based on application data generated by the POS application, and controls the printer to print by sending the print data to the printer.

A dedicated driver based on the UnifiedPOS specification is commonly used as the printer driver that operates on the POS terminal. As described in PTL 1, when the first start service request is received from the POS application, this dedicated driver occupies the communication port for the POS application. More specifically, the dedicated driver enables printing only application data from the POS application by the printer. The dedicated driver continues occupying the communication port while the POS application is running. As a result, the POS system prevents the receipt printing process from being interrupted.

CITATION LIST

Patent Literature

[PTL 1] JP 5397162

SUMMARY OF INVENTION

Technical Problem

In order to prompt customers to come again, retailers, for example, may provide such services as issuing discount tickets and coupons to customers during purchase transactions.

To provide such services without affecting the existing POS system, a separate coupon printing system could be configured with a printer specifically for printing coupons installed at the checkout counter in addition to the existing receipt printer. This, however, requires space for installing a new printer at the checkout counter. Furthermore, because a new printer for printing coupons must be purchased, the cost of introducing a coupon printing system increases.

If the existing printer is used to print coupons, there is no need to provide additional space at the checkout counter and there is no need to incur the cost of buying a new printer.

However, the dedicated driver that runs on the POS terminal occupies the communication port for the POS application while the POS application is running. The POS application is also always running on the POS terminal. Data for printing a coupon therefore cannot be sent to the printer through the communication port and the coupon cannot be printed at the appropriate time when it is necessary to print a coupon.

Considering the foregoing, an objective of the invention is to provide a printer driver enabling printing data other than the data from the specific application while the specific application is running. A further objective is to provide a POS system having a POS terminal on which the printer driver runs, and a printer.

Solution to Problem

The present invention is directed to solving at least part of the foregoing problem, and can be embodied as described below.

A printer driver according to the invention controls a printer connected to a communication port of a computer and causes the printer to print application data from a specific application, the printer driver including a communication unit that occupies the communication port when the application data is supplied, and releases the communication port when a previously set time passes.

The printer driver in this configuration occupies the communication port while application data is supplied from a specific application, and until the previously set time passes. The printer driver releases the communication port after the set time has past. More specifically, the printer driver releases the communication port except while causing the printer to print application data supplied from a specific application. If the communication port is open, other print data can be supplied to the printer through the communication port. As a result, other data that is not application data from the specific application can be printed even while a specific application is running.

The printer driver of the invention preferably also has a data generator that generates print data causing the printer to print based on the application data, and the communication unit sends the print data through the communication port to the printer when the print data is generated.

The data generator of this printer driver can generate print data causing a printer to print based on application data, and the communication unit of the printer driver can supply the print data to the printer through the communication port.

In another aspect of the invention, the set time is the time past from a first time, which is a time when or after the communication unit starting sending the print data to the printer.

This configuration can set the set time for releasing the communication port as the time past from a specific point (first time) after print data transmission. As a result, the printer driver can measure the time past from a point after starting to send the print data, or can measure the time past from some desired point a specific time after starting sending the print data. This provides greater freedom of design in setting the time to start measuring the time past, and setting the set time.

In another aspect of the invention, the first time is when the communication unit stopped sending the print data to the printer.

The printer driver thus comprised can release the communication port after the set time has past after the communication unit has finished sending print data to the printer.

As a result, the set time can be set to reflect the time required for the printer to print a single sequence of print data.

In another aspect of the invention, the set time is the time past from a second time, which is when or after supplying the application data from the application started.

This configuration can set the set time for releasing the communication port as the time past from a specific time (second time) after supplying application data starts. As a result, the printer driver can measure the time past from immediately after supplying application data starts, or can measure the time past from any desired time a specific time after supplying the application data starts. The freedom of design in setting when to start measuring the time past, and the setting of the set time, can therefore be improved.

In another aspect of the invention, the second time is when application data stopped being supplied from the application.

The printer driver thus comprised can release the communication port after the set time passes from when the supply of application data from a specific application ends. The set time can therefore be set to a time allowing for the printer to print the entire print data sequence.

In another aspect of the invention, the communication unit can communicate with a second printer driver capable of controlling the printer, receives from the second printer driver second print data causing the printer to print, and sends the second print data to the printer.

The printer driver in this aspect of the invention can communicate with a second printer driver. As a result, in addition to printing application data from a specific application, second print data can be sent from the second printer driver to the printer for printing.

In another aspect of the invention, the communication unit sends an error to the second printer driver if the communication unit is occupying the communication port when the second print data is sent from the second printer driver, and sends the second print data to the printer if the communication unit is not occupying the communication port when the second print data is sent from the second printer driver.

The printer driver sends the second print data to the printer for printing when the communication port is not occupied, and when the communication port is occupied, sends an error to the second printer driver. The second printer driver can therefore know by receiving an error that the second print data was not sent to the printer and not printed.

In another aspect of the invention, the communication unit holds the second print data received from the second printer driver, and sends the second print data to the printer after releasing the communication port.

The communication unit sends the received second print data to the printer after releasing the communication port. As a result, because the communication port is released after the set time, the second print data can be reliably sent to the printer and printed.

In another aspect of the invention, an operating command for operating a device connected to the printer and the communication port is contained in the application data; the data generator generates a control command corresponding to the operating command when the operating command is supplied; and the communication unit sends the control command to the device through the communication port when the control command is generated, and continues to occupy the communication port until an end message indicating the operation corresponding to the control command ended is received from the device.

This printer driver can control driving a printer and a device connected to the communication port. Because the printer driver keeps the communication port occupied until an end message indicating the operation corresponding to the control command ended is received from the device, device operation will not be interrupted by releasing the communication port.

Another aspect of the invention is a POS system including: a POS terminal that runs the printer driver described above, and the specific application; and a server communicatively connected to the POS terminal, and running a second printer driver and a second application that supplies second application data to the second printer driver, the second printer driver including a second data generator that generates the second print data causing the printer to print based on the second application data, and a second communication unit that sends the second print data to the communication unit of the printer driver when the second print data is generated; the specific application being a POS application that generates the application data for printing a receipt; and the second application being a coupon printing application that generates the second application data for printing a coupon.

The printer driver of the POS terminal in the POS system thus comprised occupies the communication port to which the printer is connected while a sequence of application data for printing a receipt is being supplied from the POS application, and until a set time passes after supplying the application data ends. More specifically, the printer driver occupies the communication port until a receipt is produced based on the application data. The receipt printing operation will therefore not be suspended in the POS system. The printer driver also releases the communication port after the set time has past. As a result, when the communication port is released, second print data sent to the communication unit of the printer driver from the second printer driver of the server in the POS system is supplied through the communication port to the printer. Because the second print data is generated based on the second application data for printing a coupon, the coupon is printed after printing the receipt.

In the invention, when an error indicating the communication port is occupied is sent from the printer driver, the second communication unit preferably repeats the transmission operation sending the second print data to the communication unit until an error is not returned from the printer driver.

The second communication unit can reliably print coupons because the transmission operation sending the second print data to the communication unit repeats until an error is not returned from the printer driver.

In another aspect of the invention, the printer driver occupies the communication port when application data is supplied from a specific application, and for a set time after supplying the application data from the specific application ends. After the set time after the end of supplying the application data from the specific application, the printer driver releases the communication port. In other words, the printer driver of the invention releases the communication port except while driving the printer to print a sequence of application data supplied from a specific application. If the communication port is released, print data can be supplied through the communication port to the printer. Therefore, even while a specific application is running, other data that is not application data from the specific application can be printed.

To control a printer based on application data supplied from a specific application, the printer driver of the invention has a data generator that generates print data causing a printer to print based on application data, and the communication unit of the printer driver sends the print data to the printer once the print data is generated.

Further preferably in the invention, the communication unit can communicate with a second printer driver that can control a printer, sends an error to the second printer driver if the communication port is occupied when second print data causing the printer to print is sent from the second printer driver, and sends the second print data to the printer if the communication port is not occupied when second print data is sent. As a result, second print data can be printed while a specific application is running.

In another aspect of the invention an operating command for operating a device connected to the printer and the communication port is contained in the application data; the data generator generates a control command corresponding to the operating command when an operating command is supplied; and the communication unit sends the control command to the device through the communication port when the control command is generated, and continues to occupy the communication port until an end message indicating the operation corresponding to the control command ended is received from the device. This configuration can control driving a device connected to the communication port. Device operation will also not be interrupted by releasing the communication port.

In another aspect of the invention, the printer driver occupies the communication port to which the printer is connected while a sequence of application data for printing a receipt is supplied from a POS application, and until a set time passes after supplying the application data ends. In other words, the printer driver occupies the communication port until a receipt is produced based on the application data. The receipt printing operation is therefore not interrupted. The printer driver then releases the communication port after a set time after the supply of application data from the POS application ends. When the communication port is released, the second print data is supplied through the communication port to the printer. A coupon can therefore be printed after printing a receipt.

In another aspect of the invention a second communication unit preferably repeats the transmission operation of sending second print data to the communication unit until an error is not returned from the printer driver. A coupon can therefore be reliably printed.

DESCRIPTION OF EMBODIMENTS

Embodiment

Figure 1:
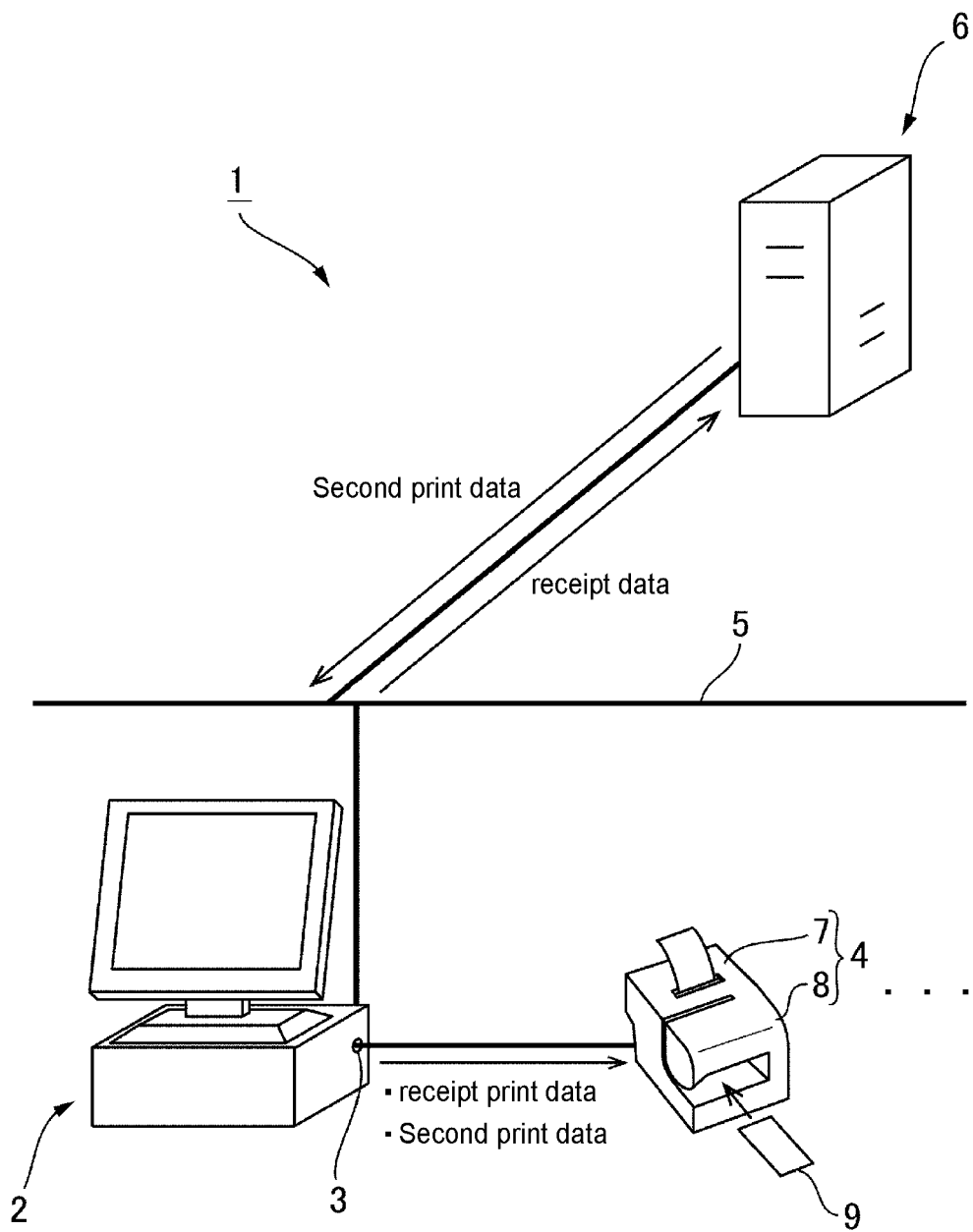
FIG. 1 illustrates a POS system according to the invention.

A POS system as an example of a printing system according to a preferred embodiment of the invention is described below with reference to the accompanying figures.
General Configuration FIG. 1 illustrates the configuration of a POS system according to the invention. As shown in FIG. 1, the POS system 1 in this embodiment includes a POS terminal (computer) 2, a POS printer 4 connected to the communication port 3 of the POS terminal 2, and a server 6 connected to the POS terminal 2 through a network 5. Both a POS terminal 2 and POS printer 4 are located at multiple checkout counters in a store. The POS printer 4 is a multifunction printer comprising a printer 7 and a check reader (device) 8. The check reader 8 magnetically reads magnetic ink character information from magnetic ink characters printed on a check 9.

Figure 2:
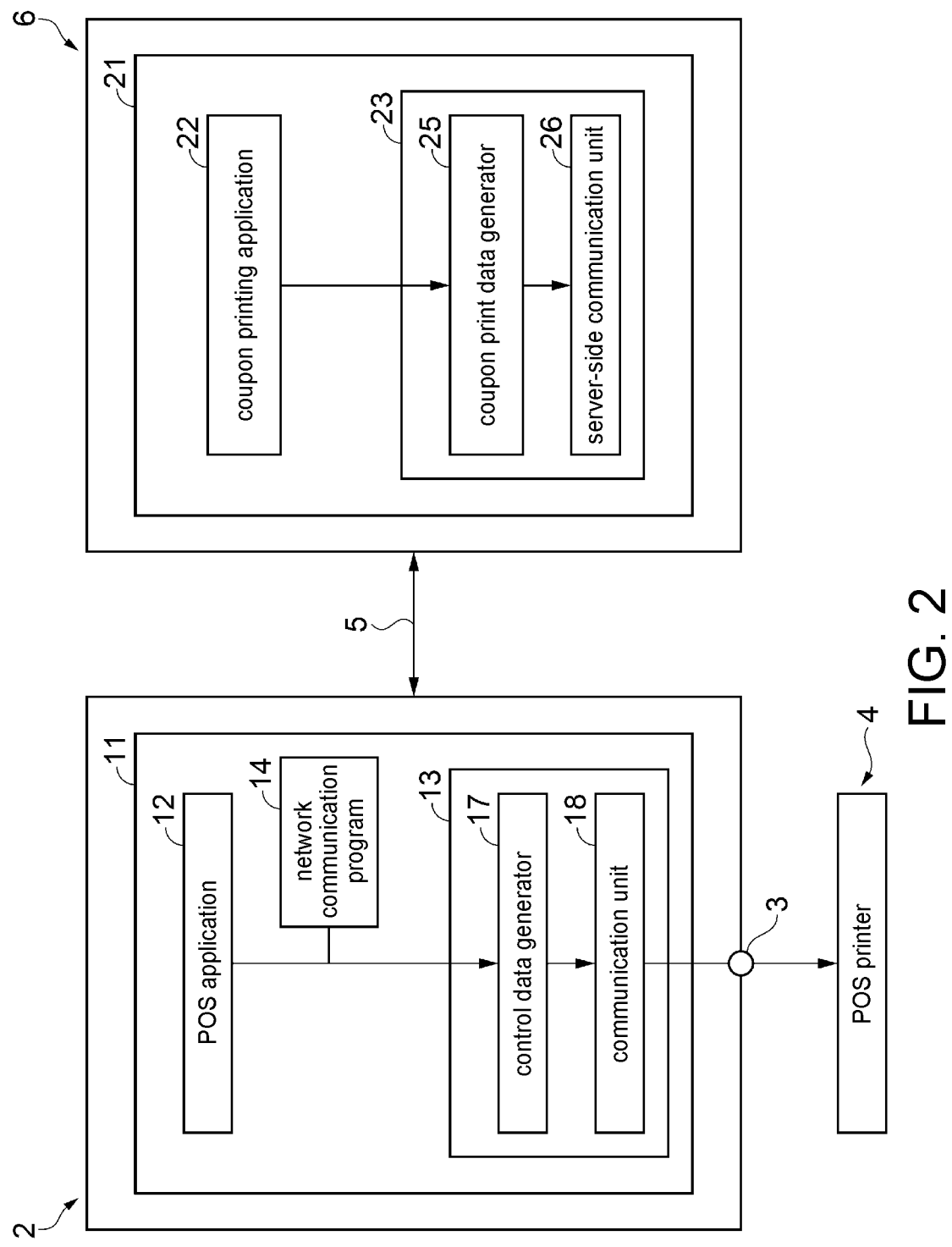
FIG. 2 is a block diagram illustrating the control system of the POS system in FIG. 1.
Figure 3:
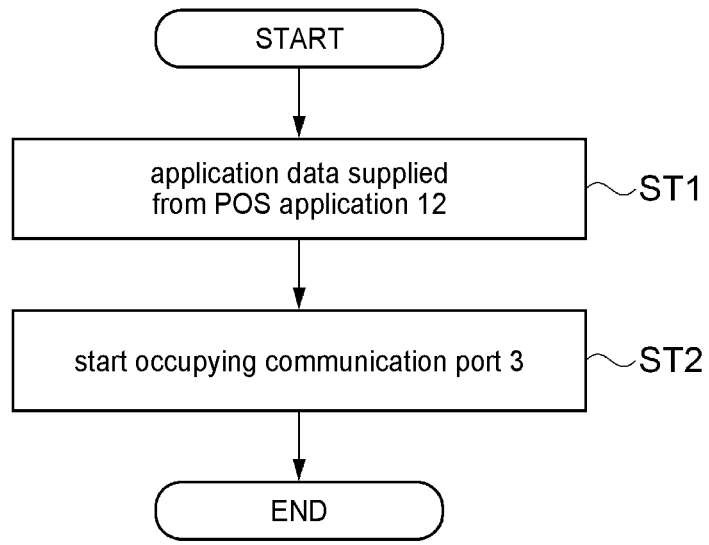
FIG. 3 is a flow chart of the operation whereby the dedicated driver occupies a communication port.
Figure 4:
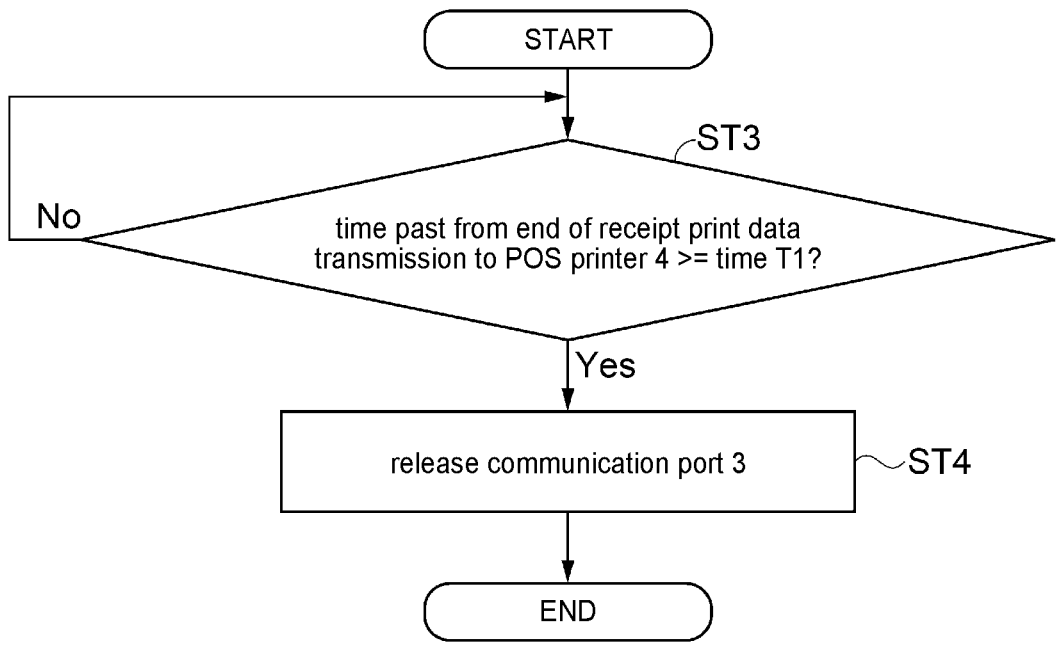
FIG. 4 is a flow chart of an example of an operation whereby the dedicated driver releases the communication port.
Figure 5:
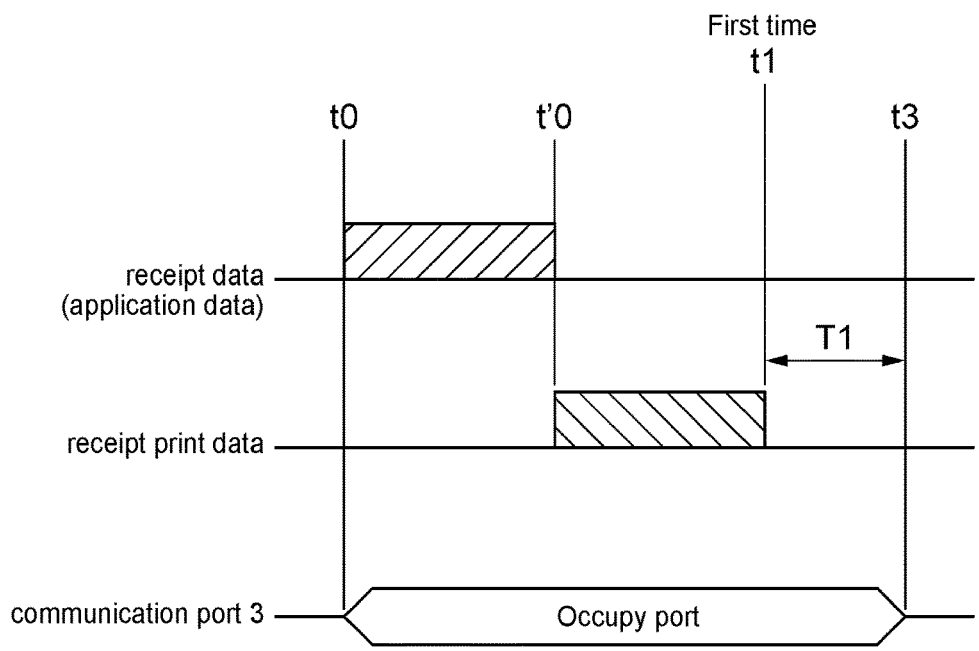
FIG. 5 is a timing chart of the port releasing operation in FIG. 4.

A sales transaction process is executed by the POS terminal 2, and when payment is received from the customer, a receipt is printed from the POS printer 4. Following printing a receipt, a coupon may also be printed from the POS printer 4. A coupon is, for example, a ticket by which a discount can be received from the price of a product on the customer's next trip to the store. If the customer pays by check 9, the MICR information on the check 9 is read by the check reader 8, and payment is processed based on the MICR information.
POS Terminal FIG. 2 is a block diagram of the control system of the POS system 1. FIG. 3 is a flow chart of the occupy operation of the communication port 3 by the dedicated driver 13. FIG. 4 is a flow chart showing an example of the release operation whereby the dedicated driver 13 releases the communication port 3. FIG. 5 is a timing chart of the release operation in FIG. 4. An OS 11 (Operating System), a POS application 12 (specific application) for executing a transaction process for products purchased by customers, a dedicated driver 13 that controls driving the POS printer 4, and a network communication program 14 for communicating with the server 6, run on the POS terminal 2.

The POS application 12 generates receipt data (application data), which is data for receipt printing, and supplies the receipt data through the OS 11 to the dedicated driver 13. The POS application 12 generates a read check command (application data; operating command) causing the check reader 8 to read a check 9, and supplies the read check command through the OS 11 to the dedicated driver 13.

The dedicated driver 13 is a dedicated printer driver for the POS application 12. The dedicated driver 13 controls driving the POS printer 4 based on the receipt data to produce a receipt. The dedicated driver 13 also controls driving the POS printer 4 based on the read check command to read the MICR information and acquire the MICR information that was read. The dedicated driver 13 conforms to the UnifiedPOS specification, but as described below the timing for occupying the communication port 3 differs from the timing of the related art.

As shown in FIG. 2, the dedicated driver 13 has a control data generator 17 (data generator) and a communication unit 18.

The control data generator 17 generates receipt print data as the print data causing the POS printer 4 to print a receipt based on the receipt data. The control data generator 17 also generates control commands causing the check reader 8 to read the magnetic ink characters based on the read check command.

As shown in FIG. 3, when application data (receipt data or read check command) is supplied from the POS application 12 (step ST1), the communication unit 18 occupies the communication port 3 of the POS terminal 2 to which the POS printer 4 connects (step ST2). When receipt print data is generated by the control data generator 17, the communication unit 18 sends the receipt print data to the POS printer 4 through the occupied communication port 3.

As shown in FIG. 4, the communication unit 18 checks if the time past since the communication unit 18 stopped transmitting receipt print data to the POS printer 4 (first time) has reached a previously set time T1 (set time) (step ST3). If the time past is less than time T1 (step ST3: No), checking how much time past continues. If the time past is time T1 or longer (step ST3: Yes), the communication unit 18 releases the communication port 3 (step ST4).

A timing chart of the operation of the dedicated driver 13 described above is shown in FIG. 5, and the operation is described below.

Transmission of receipt data as the application data from the POS application 12 to the dedicated driver 13 starts (at time t0) and transmission then ends (time t'0).

The communication unit 18 of the dedicated driver 13 that receives the receipt data occupies the communication port 3 to which the POS printer 4 is connected (time t0).

When receipt of receipt data ends (time t'0), the control data generator 17 of the dedicated driver 13 generates receipt print data based on the receipt data, and starts sending to the POS printer 4 (time t'0). Transmission then ends (time t1) when all receipt print data has been sent.

When time T1 passes after transmission of receipt print data ends (time t1: first time), the communication unit 18 releases the communication port 3 (time t3).

As a result of this operation, occupation of the communication port 3 in the POS system 1 is not released between the start and the end of printing one receipt. Printing receipts therefore proceeds smoothly. Furthermore, because the time it takes the printer to print a single sequence of print data can be set as the set time, receipt printing will not be interrupted by interrupt printing, for example.

When a control command is generated by the control data generator 17, the communication unit 18 sends the control command through the communication port 3 to the POS printer 4. The communication unit 18 then continues to occupy the communication port 3 until an end message indicating that the operation corresponding to the control command ended is received from the check reader 8. In this example, the end message indicating that the operation corresponding to the control command ended is the magnetic ink character information, and the communication unit 18 releases the communication port 3 when the magnetic ink character information is received from the check reader 8.

The network communication program 14 monitors for the POS application 12 supplying receipt data to the dedicated driver 13, and when receipt data is supplied for the POS application 12 to the dedicated driver 13, sends the receipt data through the network 5 to the server 6 (see FIG. 1).

Server

An OS 21, a coupon printing application 22 (second application) for printing coupons, and a server-side driver 23 (second printer driver) operate on the server 6. The server-side driver 23 is supplied to the OS 21 running on the server 6 as a printer driver for controlling driving the POS printer 4. The OS 21 is, for example, Windows®.

The coupon printing application 22 receives receipt data sent from the POS terminal 2 through the network 5. The coupon printing application 22 generates coupon data (second application data) causing the POS printer to print a coupon based on the receipt data. For example, based on information about the purchased products, the date or time of the purchase, or the total purchase amount, the coupon printing application 22 generates coupon data for producing a coupon related to the purchase. The coupon printing application 22 then supplies the generated coupon data to the server-side driver 23.

The server-side driver 23 has a coupon print data generator 25 as a second data generator, and a server-side communication unit 26 (second communication unit). The coupon print data generator 25 generates coupon print data as second print data causing the POS printer 4 to print a coupon based on the coupon data.

The server-side communication unit 26 can communicate through the network 5 with the communication unit 18 of the dedicated driver 13 running on the POS terminal 2. When coupon print data is generated by the coupon print data generator 25, the server-side communication unit 26 sends the coupon print data to the communication unit 18 of the dedicated driver 13.

If the communication unit 18 of the dedicated driver 13 operating on the POS terminal 2 is occupying the communication port 3 when coupon print data is sent from the server-side driver 23, it returns an error to the server-side communication unit 26. In response, the server-side communication unit 26 repeatedly sends the coupon print data to the communication unit 18 until an error is not returned from the dedicated driver 13. If the communication unit 18 of the dedicated driver 13 is not occupying the communication port 3 when coupon print data is sent, the communication unit 18 sends the coupon print data to the POS printer 4 and the POS printer 4 prints the coupon print data. In other words, the POS printer 4 is controlled to print a coupon.

Processing Operation of the POS System

When a customer purchases a product in a store, the operator inputs product information and purchase quantity information for the products the customer is purchasing through the POS terminal 2. The POS application 12 executes the sale transaction process based on the product information and quantity information, and produces receipt data. The POS application 12 also supplies the receipt data to the dedicated driver 13.

When receipt data is supplied to the dedicated driver 13, the network communication program 14 sends the receipt data to the server 6. As shown in FIG. 3, when receipt data is supplied to the dedicated driver 13 (step ST1), the dedicated driver 13 occupies the communication port 3 of the POS terminal 2 (step ST2). Next, the dedicated driver 13 generates receipt print data from the receipt data supplied from the POS application 12, and sends the receipt print data through the communication port 3 to the POS printer 4. When receipt print data is received, the POS printer 4 prints a receipt based on the receipt print data. The dedicated driver 13 continues occupying the communication port 3 while the POS printer 4 is printing the receipt print data.

Parallel to this process, coupon data is generated by the coupon printing application 22 of the server 6 and supplied to the server-side driver 23. The server-side driver 23 generates coupon print data based on the coupon data generated by the coupon print data generator 25, and sends the coupon print data by the server-side communication unit 26 to the dedicated driver 13 of the POS terminal 2.

If the dedicated driver 13 is occupying the communication port 3 when the server-side driver 23 sends the coupon print data to the dedicated driver 13, an error is returned from the communication unit 18 of the dedicated driver 13 to the server-side driver 23. The server-side communication unit 26 of the server-side driver 23 repeatedly sends the coupon print data to the dedicated driver 13 until an error is not returned.

When the time past since the communication unit 18 finished sending receipt print data to the POS printer 4 (first time) equals or exceeds the previously set time T1 (step ST3: Yes), the communication unit 18 releases the communication port 3 (step ST4). If the time past is less than time T1 (step ST3: No), monitoring the time past continues (see FIG. 4).

When the communication unit 18 receives coupon print data from the server-side driver 23 after the communication unit 18 released the communication port 3, the communication unit 18 sends the coupon print data through the communication port 3 to the POS printer 4. As a result, the POS printer 4 prints a coupon. More specifically, a coupon is produced from the POS printer 4 following the receipt.

When the customer wants to pay by check 9, the operator operates the POS terminal 2 so that the POS application 12 generates a read check command and supplies the read check command to the dedicated driver 13. The dedicated driver 13 to which the read check command was supplied then occupies the communication port 3. The dedicated driver 13 also generates a control command based on the read check command and sends the control command to the POS printer 4. As a result, the dedicated driver 13 controls driving the POS printer 4 (check reader 8) so that the POS printer 4 reads the magnetic ink characters from the check 9. The dedicated driver 13 also receives and supplies the magnetic ink character information read by the POS printer 4 through the communication port 3 to the POS application 12.

When magnetic ink character information is received from the POS printer 4, the dedicated driver 13 releases the communication port 3. The POS application 12 that received the magnetic ink character information then executes the transaction process based on the magnetic ink character information.

Operating Effect

In this example the dedicated driver 13 starts occupying the communication port 3 when receipt data is received from the POS application 12, and releases the communication port 3 when a set time, which is set to a time at which completion of receipt printing by the POS printer 4 is expected, has past. A receipt can therefore be reliably produced without receipt printing by the POS printer 4 being interrupted.

When receipt printing ends, the dedicated driver 13 releases the communication port 3 (cancels occupation). Other print data that is not data from the POS application 12 can therefore be supplied through the communication port 3 to the POS printer 4. This example supplies coupon print data supplied from the server 6 to the POS printer 4. A coupon can therefore be produced immediately after printing a receipt.

When a read check command generated by the POS application 12 is sent to the dedicated driver 13 in this example, the dedicated driver 13 occupies the communication port 3. The dedicated driver 13 continues occupying the communication port 3 until magnetic ink character information is acquired from the check reader 8 connected to the communication port 3. The check 9 reading operation of the check reader 8 is therefore not interrupted.

The dedicated driver 13 in this example may also receive journal data for printing a sales journal from the POS application 12. In this event, when journal data is supplied from the POS application 12 to the dedicated driver 13, the communication unit 18 occupies the POS terminal 2 communication port 3 to which the POS printer 4 is connected. Based on the journal data, the control data generator 17 then generates journal print data as the print data causing the POS printer 4 to print a sales journal. When journal print data is generated by the control data generator 17, the communication unit 18 sends the journal print data through the occupied communication port 3 to the POS printer 4. As a result, a sales journal is printed by the POS printer 4.

When time T1 since transmission of the journal print data ended (time t1) has past (time t3), the communication unit 18 releases the communication port 3 (see FIG. 4 and FIG. 5). The sales journal can therefore be reliably printed without printing of the sales journal by the POS printer 4 being interrupted. After printing the sales journal ends, other data that is not application data from the POS application 12 can be printed.

Example 1

In the embodiment described above, time T1 is the time past from when the communication unit 18 finishes sending receipt print data to the POS printer 4 (time t1 in FIG. 5; first time). However, time T1 is not so limited, and may be the time past from any time (first time) following when the communication unit 18 starts sending print data to the POS printer 4. For example, time T1 may start from when the communication unit 18 starts sending print data to the POS printer 4 (time t'0 in FIG. 5), or any desired time during transmission. This improves the freedom of design in setting the starting point for measuring the time past and time T1.

Example 2

Further alternatively, the communication unit 18 may measure the time past starting from any time after the POS application 12 starts supplying application data (receipt data or journal data) to the dedicated driver 13.

More specifically, the time past may be measured starting from when supplying application data from the POS application 12 to the dedicated driver 13 (second time) stops. In other words, the communication port 3 may be released if the time past without application data being supplied is greater than or equal to a previously set time T2.

Figure 6:
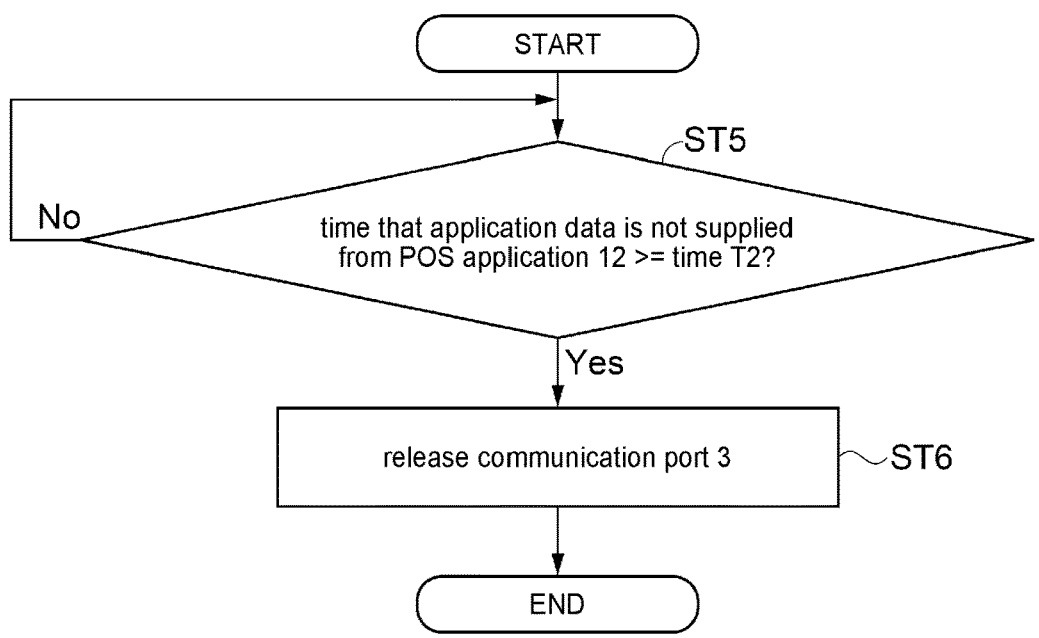
FIG. 6 is a flow chart of another example of an operation whereby the dedicated driver releases the communication port.
Figure 7:
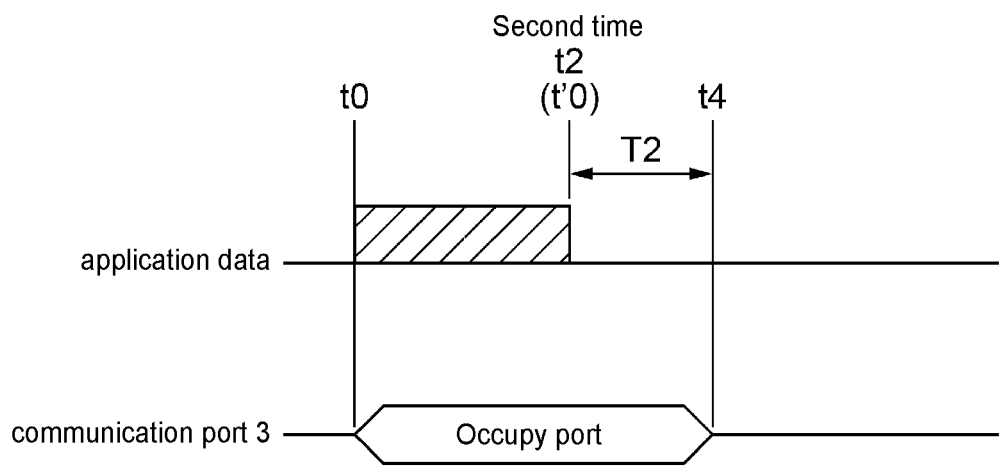
FIG. 7 is a timing chart of the port releasing operation in FIG. 6.

FIG. 6 and FIG. 7 describe operation in this example. FIG. 6 is a flow chart of another example of the communication port 3 release operation of the dedicated driver 13. FIG. 7 is a timing chart of the release operation in FIG. 6. As shown in FIG. 6 and FIG. 7, starting from when application data stops being supplied (time t'0 in FIG. 7) from the POS application 12 to the dedicated driver 13, whether or not the time past from this time (time t2: second time) has reached a previously set time T2 or longer is checked (step ST5 in FIG. 6). If the time past is not time T2 or longer (step ST5: No), checking the time past continues. If the time past is greater than or equal to time T2 (step ST5: Yes), the communication port 3 is released (step ST6 in FIG. 6, time t4 in FIG. 7).

In this example, time T2 is 1 second, for example, and the time when the dedicated driver 13 releases the communication port 3 (time t4 in FIG. 7) is set to a time after the POS printer 4 finishes printing a receipt and any coupons (sales journal). Therefore, printing receipts or sales journals by the POS printer 4 will not be interrupted, and receipts and sales journals can be reliably produced. After printing a receipt or sales journal is finished, data other than application data from the POS application 12 can be printed.

To print a receipt for a customer at the end of a transaction, some POS applications 12 supply receipt data for printing one line at a time sequentially to the dedicated driver 13. When this type of POS application 12 is running on the POS terminal 2, the dedicated driver 13 cannot determine where the receipt data for printing one receipt ends.

As a result, the dedicated driver 13 determines that supplying the receipt data required to print one receipt ended when a state in which receipt data is not supplied from the POS application 12 continues for a previously set time. The set time is set to a time greater than or equal to the time until the dedicated driver 13 finishes sending the sequence of receipt print data sequentially generated based on the sequentially supplied receipt data to the POS printer 4 after the last receipt data is received from the POS application 12, and receipt printing by the POS printer 4 ends. Therefore, even when receipt data for printing one line is supplied sequentially from the POS application 12 to the dedicated driver 13, the dedicated driver 13 occupies the communication port 3 while the POS printer 4 prints one receipt, and releases the communication port 3 after receipt printing ends.

Example 3

If the communication unit 18 is occupying the communication port 3 when coupon print data is sent from the server-side driver 23, the communication unit 18 may hold the received coupon print data (second print data) and send the saved coupon print data to the POS printer 4 after the set time (T1 or T2) has past and the communication port was released. This configuration enables sending coupon print data to the POS printer 4 and printing a coupon following printing a receipt or sales journal.

INDUSTRIAL APPLICABILITY

As described above, the invention is useful for a printer driver and POS system, and more particularly is useful when a printer driver that controls driving a POS printer based on receipt data from a POS application while the POS application is running on a POS terminal causes the POS printer to print coupon print data sent from a server connected to the POS terminal.

REFERENCE SIGNS LIST

1 POS system
2 POS terminal (computer)
3 communication port
4 POS printer
5 network
6 server
7 printer
8 check reader (device)
9 check
12 POS application (specific application)
13 dedicated driver (printer driver)
14 network communication program
17 control data generator (data generator)
18 communication unit
22 coupon printing application (second application)
23 server-side driver (second printer driver)
25 coupon print data generator
26 server-side communication unit (second communication unit)

The invention claimed is:

1. A terminal comprising a printer driver configured to:
generate first print data based on application data from a specific application, the first print data configured to cause a printer connected to a communication port to print;
occupy the communication port when the application data is supplied, and release the communication port when a previously set time passes;
transmit the first print data to the printer using the communication port;
communicate with a second printer driver, and transmit the first print data to the second printer driver;
receive, from the second printer driver, second print data based on the first print data, the second print data configured to cause the printer to print; and
transmit the second print data to the printer.

2. The terminal described in claim 1, wherein the printer driver is further configured to:
release the communication port when the previously set time has passed since a reference time,
wherein the reference time is a time at which the transmission of the first print data ended.

3. A terminal comprising a printer driver configured to:
generate print data, based on application data from a specific application, that causes a printer connected to a communication port to print;
occupy the communication port when the application data is supplied, and release the communication port when a previously set time passes;
send the print data through the communication port to the printer when the print data is generated;
communicate with a second printer driver configured to control the printer, receive from the second printer driver second print data that causes the printer to print, and send the second print data to the printer;
send an error indication to the second printer driver if the printer driver is occupying the communication port when the second print data is sent from the second printer driver; and
send the second print data to the printer if the printer driver is not occupying the communication port when the second print data is sent from the second printer driver.

4. A terminal comprising a printer driver configured to:
generate print data, based on application data from a specific application, that causes a printer connected to a communication port to print;
occupy the communication port when the application data is supplied, and release the communication port when a previously set time passes;
send the print data through the communication port to the printer when the print data is generated;
communicate with a second printer driver configured to control the printer, receive from the second printer driver second print data that causes the printer to print, and send the second print data to the printer; and
hold the second print data received from the second printer driver, and send the second print data to the printer after releasing the communication port.

5. A terminal comprising a printer driver configured to:
generate print data, based on application data from a specific application, that causes a printer connected to a communication port to print, the application data comprising an operating command for operating a device connected to the printer and the communication port;
generate a control command corresponding to the operating command when the operating command is supplied;
occupy the communication port when the application data is supplied, and release the communication port when a previously set time passes;
send the print data through the communication port to the printer when the print data is generated; and
send the control command to the device through the communication port when the control command is generated, and continue to occupy the communication port until an end message indicating that an operation corresponding to the control command has ended is received from the device.

6. A point of sale system comprising:
a point of sale terminal configured to execute:
  a first printer driver configured to:
    generate print data, based on application data from a specific application, that causes a printer connected to a communication port of a computer to print;
    occupy the communication port when the application data is supplied, and release the communication port when a previously set time passes;
    send the print data through the communication port to the printer when the print data is generated; and
    communicate with a second printer driver configured to control the printer, receive from the second printer driver second print data that causes the printer to print, and send the second print data to the printer; and
  the specific application; and
a server communicatively connected to the point of sale terminal, and configured to execute the second printer driver and a second application configured to supply second application data to the second printer driver,
wherein the second printer driver is configured to generate, based on the second application data, the second print data that causes the printer to print, and is configured to send the second print data to the first printer driver when the second print data is generated,
the specific application is a point of sale application configured to generate the application data for printing a receipt, and
the second application is a coupon printing application configured to generate the second application data for printing a coupon.

7. The point of sale system described in claim 6, wherein:
the second printer driver is configured such that when an error indicating the communication port is occupied is sent from the first printer driver, the second printer driver repeats the transmission operation sending the second print data to the first printer driver until an error is not returned from the first printer driver.

8. A method for controlling a terminal comprising a printer driver, the method comprising:
generating print data, based on application data from a specific application, that causes a printer connected to a communication port to print;
occupying the communication port when the application data is supplied, and releasing the communication port when a previously set time passes;
transmitting the print data to the printer using the communication port;
communicating with a second printer driver, and transmitting the print data to the second printer driver; and
receiving second print data, based on the print data from the second printer driver, that causes the printer to print, and sending the second print data to the printer.

9. The method for controlling a terminal described in claim 8, further comprising:
sending an error indication to the second printer driver responsive to determining that the printer driver is occupying the communication port when the second print data is sent from the second printer driver; or
sending the second print data to the printer responsive to determining that the printer driver is not occupying the communication port when the second print data is sent from the second printer driver.

* * * * *